United States Patent [19]

Irvin et al.

[11] Patent Number: 4,604,216
[45] Date of Patent: Aug. 5, 1986

[54] DRILLING FLUIDS

[75] Inventors: Howard B. Irvin; G. Allan Stahl; Earl Clark, all of Bartlesville, Okla.

[73] Assignee: Phillips Petroleum Company, Bartlesville, Okla.

[21] Appl. No.: 619,108

[22] Filed: Jun. 11, 1984

Related U.S. Application Data

[62] Division of Ser. No. 435,175, Oct. 19, 1982.

[51] Int. Cl.$^4$ .............................................. C09K 7/00
[52] U.S. Cl. ............................. 252/8.510; 252/8.511
[58] Field of Search ............................... 526/317, 369; 252/8.5 C

[56] References Cited

U.S. PATENT DOCUMENTS

| | | | |
|---|---|---|---|
| 2,244,703 | 6/1941 | Hubbuch | 526/317 |
| 2,718,497 | 9/1955 | Oldham et al. | 252/8.5 C |
| 3,915,921 | 10/1975 | Schlatzer, Jr. | 260/17.4 |
| 3,943,111 | 3/1976 | Fritze et al. | 525/369 |
| 4,066,583 | 1/1978 | Spaulding | 525/369 |
| 4,394,483 | 7/1983 | Hobes et al. | 525/369 |

Primary Examiner—Paul Lieberman
Assistant Examiner—John F. McNally
Attorney, Agent, or Firm—French & Doescher

[57] ABSTRACT

Polymers derived by copolymerizing a hydrophilic vinyl monomer, such as acrylic acid, with at least one hydrophobic vinyl monomer, such as an acrylic acid ester, a methacrylic acid ester, a vinyl ester of a saturated monocarboxylic acid having from 1 to 3 carbon atoms, and the like, prepared in a suitable inert, low chain transfer, organic liquid medium, such as n-hexane, cyclohexane, and chlorofluorocarbons such as 1,1,2-trichloro-1,2,2-trifluoroethane, and neutralized by a suitable base while still slurried in the inert low chain transfer organic liquid medium, perform effectively as water loss additives for drilling fluids under high temperature conditions. Such water loss control additives are especially effective when employed in drilling fluids having high solids content. Also disclosed are drilling fluids employing such water loss control additives as well as a method of drilling a bore hole in the earth using drilling fluids employing such water loss control additives.

37 Claims, No Drawings

DRILLING FLUIDS

This application is a division of application Ser. No. 435,175, filed October 19, 1982.

Drilling fluids are used in the drilling of oil and gas wells to cool and lubricate the rotating drill bit and drill string shaft, convey rock cuttings to the earth surface for removal, prevent loss of water and drilling fluids into the formation through which the bore hole is being drilled, and to control the entry of liquids into the bore hole from the various formations being penetrated during the drilling. To accomplish these ends, a drilling fluid, generally referred to as drilling mud, comprises several components. For example, weighting solids such as barites are often added to such drilling muds to develop the desired density in the mud, while bentonite or various clays are often added to increase the drilling and viscosity to improve the capability of the drilling muds to convey rock cuttings upwardly through the borehole from the drill bit and remove the cuttings from the borehole.

It is also known to add various polymers to drilling fluids or drilling muds to function as viscosifiers, dispersants and water loss additives in the drilling fluids. The use of polymers for such purposes meets with many problems. Such polymers are often unstable at high borehole temperatures, e.g., temperatures around about 360° F. (182° C.), and tend to lose their desired physical characteristics, such as plastic viscosity, yield point and resistance to water loss. The previous use of polymers for water loss control in drilling fluids has often resulted in an undesirable increase in viscosity of the drilling fluids.

The present invention provides polymers suitable for use as water loss additives for drilling fluids and methods for the preparation thereof which overcome the disadvantages encountered with previous polymers noted above.

It is an object of the present invention to provide improved drilling fluid additives.

Another object of the present invention is to provide an improved method of producing drilling fluid additives.

A further object of the present invention is to provide an improved method of drilling a borehole.

Another object of the present invention is to provide an improved drilling fluid additive which is readily dispersible in aqueous drilling fluids.

Yet another object of the present invention is to provide a method of producing drilling fluid additives which is characterized by increased simplicity and efficiency.

Still another object of the present invention is to provide an improved drilling fluid for use in the drilling of a borehole.

Yet another object of the present invention is to provide an improved drilling fluid which exhibits high temperature stability over extended periods of time.

Another object of the present invention is to provide an improved drilling fluid which provides enhanced water loss control characteristics.

A further object of the present invention is to provide an improved drilling fluid additive characterized by enhanced water loss control characteristics coupled with a minimum increase in viscosity when employed in a drilling fluid.

As used herein, the term, copolymer, includes any polymer comprising two or more monomers; and the term, copolymerization, means the polymerization of two or more monomers.

The foregoing and other objects, advantages and aspects of the present invention will become readily apparent from the following detailed description of the invention and the appended claims.

The polymers of this invention which are employed with drilling fluids as water loss additives after at least partial neutralization are, preferably, those polymers derived from copolymerizing a hydrophilic vinyl monomer selected from among acrylic acid (AA), methacrylic acid (MAA), other related monomers and mixtures of any two or more thereof with at least one hydrophobic vinyl monomer selected from among acrylic acid esters, such as, for example, methyl acrylate and ethyl acrylate, methacrylic acid esters, such as, for example, methyl methacrylate and ethyl methacrylate, vinyl esters of saturated monocarboxylic acids having 1 to 3 carbon atoms, such as, for example, vinyl formate and vinyl acetate, other related monomers, and mixtures or combinations of any two or more thereof. Presently preferred polymers of this invention are those selected from among an acrylic acid-methyl methacrylate copolymer (AA-MMA), a methacrylic acid-methyl acrylate copolymer (MAA-MA), an acrylic acid-vinyl acetate copolymer (AA-VA), and an acrylic acid-methyl methacrylate-vinyl acetate terpolymer (AA-MMA-VA).

The polymers are prepared in any suitable inert, low free radical chain transfer, organic liquid medium. Nonpolar diluents or solvents such as n-hexane, cyclohexane, chlorofluorocarbons such as 1,1,2-trichloro-1,2,2-trifluoroethane, and mixtures of any two or more thereof, are preferred since the polymer formed is insoluble in the medium and can be readily separated therefrom, if desired, by suitable means such as filtration. The diluent or solvent 1,1,2-trichloro-1,2,2-trifluoroethane is commercially available under the registered trademark Freon-113 ®. The separated product can be washed, dried, slurried in water and treated with an appropriate amount of sodium hydroxide to obtain the sodium salt as an aqueous solution. An appropriate amount of sodium hydroxide for this purpose would be, for example, an amount sufficient to raise and maintain the pH of the slurry to a value in the range from about 5.3 to about 12, preferably from about 5.5 to about 11, and more preferably from about 6 to about 8.

We have discovered that it is possible, and, under certain circumstances, highly advantageous, to neutralize polyacids or polymers containing carboxyl grous by adding at least one suitable base to a slurry of such a polyacid or acidic polymer or copolymer comprising such polyacid and an organic reaction medium in which the polymerization forming the polyacid or acidic polymer or copolymer took place. While any base can be employed which will effect the desired neutralization of the polyacid or acidic polymer or copolymer and produce the desired salt form thereof, examples of suitable bases include, but are not limited to, sodium hydroxide, potassium hydroxide, and sodium carbonate. Such bases can be in dry form or liquid form, and can be in concentrated or dilute form such as, for example, an aqueous solution. Such a neutralization process can be advantageously employed in neutralizing copolymers prepared in an inert, low chain transfer, organic medium as described in the immediately preceding two paragraphs.

While this neutralization process is generally applicable to the neutralization of any suitable polyacid or acidic polymer or copolymer, it is presently preferred to employ the process with polymer- or copolymer-reaction medium slurries containing from about 1 wt.% to about 25 wt.% solids, and, more preferably, from about 5 wt.% to about 15 wt.% solids based on the total weight of the slurry. While any suitable base can be employed in this neutralization process which will achieve and maintain the desired degree of neutralization of the polymer or copolymer, it is preferred to employ a base which leads to the production of a neutralized polymer or copolymer which, after substantial removal of the reaction medium and water from the polymer- or copolymer-reaction medium slurry is readily soluble in water. In one embodiment of the invention, it is presently deemed advantageous to employ an aqueous base solution, such as, for example, an aqueous solution of sodium hydroxide, comprising at least about 35 wt.% base, preferably from about 35 wt.% to about 73 wt.% base, and more preferably from about 40 wt.% to about 73 wt.% base, based on the total weight of the solution. It is deemed, especially advantageous to employ an aqueous solution of sodium hydroxide comprising from about 35 wt.% to about 73 wt.% based on the total weight of the solution.

While any quantity of a suitable base can be employed in the neutralization of acid polymers or copolymers in a polymer- or copolymer-reaction medium slurry which will achieve the desired degree of neutralization of the polymer or copolymer, it is generally preferable to use a quantity of suitable base which will raise and maintain the pH of the neutralized polymer or copolymer to a value in the range from about 5.3 to about 12, more preferably in the range from about 5.5 to about 11, and more preferably still in the range from about 6 to about 8 for a polymer solution in water of at least about 1 wt.% concentration.

A free radical initiator is normally employed in the polymerization process. Such initiators are well known in the art and include azo compounds such as azobisisobutyronitrile and organic peroxy compounds such as t-butyl peroxypivalate. The amount of initiator used, based on the weight of monomers employed, depends on the monomers chosen as well as the chosen reaction medium and the polymer molecular weight desired. Sufficient initiator is employed such that the weight average molecular weight of the resulting polymers will range from about 100,000 to 500,000. For example, when preparing the acrylic acid-methyl methacrylate copolymers in n-hexane with t-butyl peroxypivalate as the initiator, the initiator level can range from about 0.05 to about 1.0 weight percent, preferably from about 0.1 to about 0.8 weight percent, based on the weight of monomers charged.

The mole ratio of hydrophilic monomer or monomers to hydrophobic monomer or monomers can range from about 7:1 to about 1:1, preferably from about 3.5:1 to about 2:1. For example, for the most preferred acrylic acid, methyl methacrylate copolymers, the AA-MMA mole ratios range from about 3.2:1 to 2.1:1, corresponding to a AA-MMA weight ratio range from about 70:30 to about 60:40. For the acrylic acid-methyl methacrylate-vinyl acetate copolymer, the weight ratios of AA-MMA-VA can range from about 60-30-10 to about 60-10-30 and from about 70-20-10 to about 70-10-20 for best results. The equivalent mole ratios are in the range from about 2.8:1:0.33 to about 8.3:1:3.5 and from about 4.8:1:0.58 to about 9.7:1:2.3.

Generally, in preparing the polymers of the instant invention, the total monomer level with respect to the reaction medium can range from about 5 to about 30 weight percent, more preferably from about 10 to about 20 weight percent based on the weight of the reaction medium.

Polymerization temperatures are generally in the range conventionally practiced and can range, for example, from about 25° C. to about 100° C., preferably from about 50° C. to about 70° C., and most preferably at about 50° C for the best results. The polymers prepared at about 50° C. exhibit the best control of water loss in the tests used.

Each polymerization was conducted for a sufficient length of time to obtain substantially quantitative conversion. Generally, a polymerization time in the range from about 10 minutes to about 30 hours is satisfactory. More specifically, when about 20 g of total monomers are employed in about 200 mL of reaction medium containing from about 0.1 to about 1.5 weight percent, and preferably from about 0.1 to about 0.8 weight percent t-butyl peroxypivalate and a reaction temperature ranging from about 50° C. to about 70° C., a polymerization time of from about 15 to about 30 hours is used for convenience; however, the conversion is substantially complete in less than four hours. In commercial operations, it may be desirable to reduce the polymerization time to about one hour or less, or even to about 10 minutes.

In a typical bench scale preparation, the appropriate molar ratio of acrylic acid and methyl methacrylate (20.0 g total) was charged to a 10 fl oz (296 mL) crown top beverage bottle containing 200 mL of the reaction medium and the desired quantity of t-butyl peroxypivalate initiator solution, usually about 0.75 weight percent based on total weight of monomers. The initiator, available commercially under the trademark Lupersol-11 ® from Pennwalt Corp. was contained as a 75 weight percent solution in mineral spirits. The monomers were of technical grade purity and used as received.

Each crown top bottle was degassed for about 20 minutes with argon after charging the components, capped, and immediately placed in a water bath maintained at a desired temperature, for example at 50° C. or 70° C., and rotated the desired time. All polymerization runs produced polymer slurries. Each polymer was isolated by filtration, dried, and weighed to confirm that the degree of conversion was sustantially quantitative, e.g., from about 95 to about 100 percent of theoretical.

After determination of yields, the polymers were slurried in distilled water to which was added a predetermined quantity of sodium hydroxide sufficient to raise the polymer solution pH and maintain it at a value in the range of from about 6 to about 8 and produce about a 10 weight percent solution of the neutralized polymer or dry polymer salt in the water.

The effectiveness of the polymers as water loss control agents and rheological control agents were determined at several temperatures in a moderately saline drilling mud and in a saline-saturated drilling mud.

The first mud, designated saline mud A, comprised 3.5 weight percent attapulgite clay in water containing 5 weight percent NaCl. The second mud, designated saturated saline mud B, comprised 3.5 weight percent attapulgite clay in water saturated with NaCl.

A suitable amount of the polymer salt solution or the dry polymer salt was added to the mud samples to obtain the desired concentrations. While the concentration of the polymer salt solution or the dry polymer salt contained in a drilling fluid or mud can be any concentration which will achieve the desired results from the drilling fluid, it is presently preferred to employ a concentration of the polymer salt solution or the dry polymer salt in the range from about 1 to about 3 pounds per barrel of drilling fluid or mud. As used herein, the term "barrel" is defined as having a capacity of 42 U.S. gallons. After the addition of the polymer sample to the mud slurry, withholding part of the water used in making the mud slurry to compensate for the water introduced by the polymer solution when used, the mud samples were mixed for twenty minutes with a Hamilton-Beach Multimixer and then aged at least 2 hours at room temperature, e.g., about 25° C. The samples were then stirred an additional two minutes with the mixer just before determining their initial plastic viscosities and yield points at about 25° C. with a model 35 Fann V-G meter, a direct indicating viscosimeter, in accordance with API RP 13B, 2nd ed., April 1969, "Standard Procedure for Testing Drilling Fluids", American Petroleum Institute, Division of Production, Dallas, Tex. Initial water loss at about 25° C. was also determined in accordance with this reference. Additionally, the pH of each sample was determined. These tests were then performed again after the samples were aged overnight at about 80° C. and cooled to room temperature.

Selected polymers were also evaluated under more severe conditions. For these tests, base mud A was treated with 12 lb/bbl of bentonite, 2 lb/bbl of a thinner sold under the trademark Desco and available from Chromalloy Corp., Conroe, Tex., 3 lb/bbl of polymer and NaOH. A series of the treated muds was also additionally treated with gypsum to ascertain its effect on the polymers. For example, 1 lb/bbl gypsum when added to the mud samples provides about 400 ppm calcium ion in the mud filtrates as determined by versenate titration.

These treated mud samples were generally tested initially at room temperature and again at room temperature after aging overnight at about 360° F. (182° C.). Following this second series of tests an additional water loss test was performed at about 325° F. (163° C.) with a differential pressure of about 500 psi. These tests were made with about 600 psi applied to the water loss cell and about 100 psi applied to the filtrate collector.

EXAMPLE I

Three series of acrylic acid-containing polymers were prepared in which the acrylic acid (AA) content varied from about 60 weight percent to about 100 weight percent, and the methyl methacrylate (MMA) content varied from zero to about 40 weight percent, based on the total monomer weight. In each run the total monomer weight was about 20.0 g; 0.20 g of t-butyl peroxypivalate (BPP) solution containing 0.15 g BPP in mineral spirits, which is equivalent to about 0.75 weight percent BPP based on the total monomer weight, was used; and the reaction was conducted for a period of time in the range from about 16 to about 25 hours in 200 mL of the specified liquid organic compound at about 50° C. until conversion was substantially complete. The polymers were isolated, washed with n-hexane, Freon-113 ® or the like, and vacuum dried. The yields ranged from about 95 to about 100 percent of theoretical. Each polymer was slurried in about 135 g of distilled water and treated with sufficient 6M NaOH solution to obtain an aqueous solution having a constant pH value in the range of about 6 to about 8 and containing about 10 weight percent solids based on the total weight of the aqueous solution.

In one series, the reaction medium was n-hexane, with 200 mL of n-hexane being equivalent to about 132 g. In the second series, 200 mL of Freon-113 ®, equivalent to about 313 g, was employed as the reaction medium. In the third series, 200 mL of t-butyl alcohol, equivalent to about 156 g, was employed as the reaction medium.

Each polymer was evaluated at a loading (dry polymer salt) of 1-lb/bbl and of 3 lb/bbl in saline mud A (5% salt water mud) and in saturated saline mud B (saturated salt water mud), said mud being described previously.

The initial properties of each treated mud sample were evaluated at room temperature (about 25° C.) for plastic viscosity (PV) in centipoises (cp), yield point (YP) in lb/100 ft², and water loss (WL) in mL/30 minutes, in the manner previously described. The results are presented in Tables 1A, 1B and 1C.

TABLE 1A

| Polymer Wt. % MMA | Saline Mud A | | | | Saturated Saline Mud B | | | |
|---|---|---|---|---|---|---|---|---|
| | 1 Lb/Bbl | | 3 Lbs/Bbl | | 1 Lb/Bbl | | 3 Lbs/Bbl | |
| | PV$^{(a)}$/YP$^{(b)}$ | WL$^{(c)}$ | PV$^{(a)}$/YP$^{(b)}$ | WL$^{(c)}$ | PV$^{(a)}$/YP$^{(b)}$ | WL$^{(c)}$ | PV$^{(a)}$/YP$^{(b)}$ | WL$^{(c)}$ |
| AA-MMA Copolymers Prepared In n-Hexane at 50° C. | | | | | | | | |
| 0 | 4/5 | 68.0 | 6/6 | 20.5 | 7/15 | 55.1 | 14/6 | 13.0 |
| 5 | 4/6 | 69.0 | 6/6 | 21.0 | 8/12 | 44.0 | 13/7 | 13.0 |
| 10 | 3/6 | 58.0 | 7/4 | 23.0 | 7/11 | 38.0 | 12/10 | 14.0 |
| 20 | 5/3 | 40.0 | 7/4 | 23.0 | 7/4 | 24.0 | 19/9 | 10.9 |
| 30 | 4/2 | 26.5 | 7/4 | 11.0 | 7/5 | 19.0 | 9/5 | 8.5 |
| Mud A Only | 5/10 | 129 | — | — | — | — | — | — |
| AA-MMA Copolymers Prepared In n-Hexane at 50° C. | | | | | | | | |
| 0 | 2/5 | 60.0 | 4/4 | 14.0 | 6/12 | 70.0 | 7/5 | 18.0 |
| 5 | 3/2 | 53.0 | 10/9 | 14.5 | 5/8 | 57.0 | 10/3 | 12.5 |
| 10 | 8/4 | 50.0 | 6/3 | 16.0 | 6/6 | 46.0 | 13/7 | 10.4 |
| 20 | 4/1 | 48.0 | 6/3 | 24.5 | 7/6 | 31.0 | 16/9 | 12.5 |
| 30 | 3/2 | 34.0 | 6/3 | 20.5 | 8/4 | 21.0 | 13/8 | 6.0 |
| 40 | 3/1 | 17.5 | 6/1 | 10.0 | 10/6 | 29.0 | 9/3 | 4.3 |
| AA-MMA Copolymers Prepared In Tert-Butyl Alcohol at 50° C. | | | | | | | | |
| 0 | — | — | 4/4 | 53.0 | — | — | 6/4 | 54.0 |
| 5 | — | — | 5/5 | 66.0 | — | — | 9/3 | 38.0 |
| 10 | — | — | 4/5 | 65.0 | — | — | 7/3 | 39.5 |
| 20 | 3/5 | 79.0 | 5/5 | 63.0 | — | — | 4/2 | 17.0 |

TABLE 1A-continued

| Polymer | Saline Mud A | | | | Saturated Saline Mud B | | | |
|---|---|---|---|---|---|---|---|---|
| | 1 Lb/Bbl | | 3 Lbs/Bbl | | 1 Lb/Bbl | | 3 Lbs/Bbl | |
| Wt. % MMA | PV$^{(a)}$/YP$^{(b)}$ | WL$^{(c)}$ | PV$^{(a)}$/YP$^{(b)}$ | WL$^{(c)}$ | PV$^{(a)}$/YP$^{(b)}$ | WL$^{(c)}$ | PV$^{(a)}$/YP$^{(b)}$ | WL$^{(c)}$ |
| 30 | 3/4 | 61.0 | 6/4 | 62.0 | — | — | 6/1 | 16.1 |

Note: A dash signifies no determination was made.
$^{(a)}$cp
$^{(b)}$lbs/100 ft$^2$
$^{(c)}$mL/30 min Inspection of the data presented in Tables 1A, 1B and 1C shows that the performance of the polymers at moderate temperatures generally improve as the methyl methacrylate content of the copolymers approaches 30 or 40 weight percent, which is the preferred level range based on these results. At these levels of methyl methacrylate content, the plastic viscosity and yield point of the muds are generally not significantly increased by the presence of the polymers. The data also show that the polymers made in n-hexane and Freon-113 ® are more effective than the polymers made in t-butyl alcohol.

EXAMPLE II

The effect of higher molecular weight acrylic acid-methyl methacrylate copolymers (as the sodium salts), prepared in n-hexane in one series and in Freon-113 ® in another series, as water loss control agents in the base muds was ascertained. The polymer samples were prepared as in Example I except that the BPP level was decreased from about 0.75 weight percent to about 0.19 weight percent. A decrease in initiator concentration causes a decrease in the number of free radical fragments available in the monomer solution to initiate polymerization. This decrease, in turn, leads to an increase in polymer molecular weight. Thus, these polymers are of higher molecular weight than those shown in Example I.

Each polymer salt was evaluated as before in saturated saline mud B. The results are given in Table 2.

with the 50:50 AA:MMA copolymer which is not usually considered desirable in a drilling mud.

EXAMPLE III

This example was directed to the determination of high temperature water loss properties. Three series of copolymers were prepared in the manner previously described. In one series the reaction medium was n-hexane, in the second series it was cyclohexane, and in the third series it was Freon-113 ®. Several initial levels were also employed in each series. A polymerization time of about 21 hours was employed in preparing the 60:40 AA:MMA copolymers in n-hexane and in Freon-113 ®. All other polymers were given about a 25 hour polymerization time. Each polymer was prepared at about 50° C. As before, each polymer was evaluated in treated saline mud A as the sodium salt in a 10 weight percent aqueous solution at a pH value in the range from about 6 to about 8. The mud was also treated with 12 lb/bbl bentonite clay and 2 lb/bbl Desco thinner to reduce the adverse effects of high temperature aging on the clays, and sufficient NaOH to give and maintain a pH value in the range from about 10 to about 11.

After determining the initial properties of the mud samples at room temperature, the samples were aged at about 360° F. (182° C.) in brass bombs, cooled to room temperature, and the shear strengths of the muds were then measured. The muds were then removed, stirred for about 20 minutes with the previously described multimixer, and the tests of plastic viscosity, yield point

TABLE 2

Higher Molecular Weight AA-MMA Copolymers Prepared at 50° C.
Saturated Saline Mud B Results

| Polymer | n-Hexane Medium | | | | Freon 113- Medium | | | |
|---|---|---|---|---|---|---|---|---|
| | 1 Lb/Bbl | | 3 Lbs/Bbl | | 1 Lb/Bbl | | 3 Lbs/Bbl | |
| Wt. % MMA | PV$^{(a)}$/YP$^{(b)}$ | WL$^{(c)}$ | PV$^{(a)}$/YP$^{(b)}$ | WL$^{(c)}$ | PV$^{(a)}$/YP$^{(b)}$ | WL$^{(c)}$ | PV$^{(a)}$/YP$^{(b)}$ | WL$^{(c)}$ |
| 0 | 8/11 | 47.0 | 9/11 | 9.0 | 7/4 | 40.0 | 9/1 | 5.0 |
| 5 | 5/3 | 29.0 | 7/2 | 6.0 | 6/4 | 37.0 | 9/3 | 7.0 |
| 10 | 5/5 | 28.0 | 10/1 | 6.0 | 7/1 | 33.0 | 10/3 | 6.5 |
| 20 | 6/4 | 20.5 | 8/2 | 5.5 | 6/1 | 18.0 | 10/2 | 6.5 |
| 30 | 7/1 | 15.0 | 12/0 | 6.0 | 8/1 | 18.0 | 11/4 | 5.5 |
| 40 | 8/1 | 16.0 | 15/5 | 4.5 | 6/1 | 25.0 | 14/6 | 4.5 |
| 50 | — | — | — | — | 7/3 | 44.0 | 91/7* | 5.5 |

Note: A dash signifies no determination was made.
$^{(a)}$cp
$^{(b)}$lb/100 ft$^2$
$^{(c)}$mL/30 min
*foam Comparison of the results shown in Table 2 with those shown in Tables 1A and 1B shows that somewhat better water loss control is achieved with the higher molecular weight polymers at the moderate temperatures employed than with the equivalent lower molecular weight polymers. It is noted that foaming occurred and room temperature water loss were repeated. An additional water loss test at about 325° F. (163° C.) and at a differential pressure of about 500 psi was also performed. The results are reported in Tables 3A, 3B and 3C.

TABLE 3A

| Wt. % MMA | Wt. % BPP | Initial Water Loss | | Properties after 16 Hours at 360° F. (182° C.) | | | | | | | |
|---|---|---|---|---|---|---|---|---|---|---|---|
| | | | | 1 Lb/Bbl | | | 2 Lb/Bbl | | | HTWL(a) | |
| | | 1 Lb/Bbl | 2 Lb/Bbl | SS(b) | PV(c)/YP(d) | WL(e) | SS(b) | PV(c)/YP(d) | WL(e) | 1 Lb/Bbl | 2 Lb/Bbl |
| *AA-MMA Copolymers, High Temperature Runs* | | | | | | | | | | | |
| *Variable Initiator (BBP) Levels, n-Hexane Medium* | | | | | | | | | | | |
| 40 | 0.75 | 8.0 | 5.9 | 150 | 10/23 | 10.0 | 150 | 12/23 | 5.4 | 46 | 27 |
| 40 | 0.38 | 6.0 | 4.4 | 230 | 9/25 | 10.0 | 210 | 16/22 | 5.4 | 48 | 30 |
| 40 | 0.19 | 5.2 | 4.3 | 230 | 12/24 | 10.7 | 160 | 8/29 | 5.0 | 42 | 28 |
| 30 | 0.75 | 5.2 | 4.3 | 200 | 10/25 | 13.0 | 150 | 11/30 | 5.8 | 38 | 30 |
| 30 | 0.38 | 5.2 | 4.2 | 180 | 11/28 | 11.2 | 150 | 14/23 | 5.7 | 39 | 30 |
| 30 | 0.19 | 5.2 | 3.7 | 150 | 11/24 | 10.4 | 135 | 14/28 | 5.9 | 41 | 28 |
| *AA-MMA Copolymers, High Temperature Tests* | | | | | | | | | | | |
| *Variable Initiator (BPP) Level, Cyclohexane Medium* | | | | | | | | | | | |
| 40 | 0.75 | 6.3 | 5.5 | 160 | 12/21 | 10.6 | 170 | 12/23 | 6.0 | 36 | 31 |
| 40 | 0.38 | 8.6 | 5.4 | 150 | 10/22 | 11.0 | 150 | 15/20 | 5.6 | 36 | 29 |
| 40 | 0.19 | 6.7 | 6.7 | 160 | 11/24 | 10.5 | — | 10/22 | 5.4 | 37 | 32 |
| 40 | 0.075 | 5.5 | 5.0 | 210 | 10/26 | 12.0 | — | 10/23 | 6.0 | 35 | 30 |
| *AA-MMA Copolymers, High Temperature Tests* | | | | | | | | | | | |
| *Variable Initiator (BPP) Level, Freon-113 ® Medium* | | | | | | | | | | | |
| 40 | 0.75 | — | 4.3 | — | — | — | 170 | 12/18 | 5.4 | — | 26 |
| 40 | 0.19 | — | 4.0 | — | — | — | 200 | 17/23 | 5.8 | — | 36 |
| 30 | 0.75 | — | 5.2 | — | — | — | 170 | 15/24 | 5.6 | — | 29 |
| 30 | 0.19 | — | 4.0 | — | — | — | 170 | 11/30 | 5.4 | — | 31 |

Base mud only, PV(c)/YP(d) = 5/20, WL = 11.0 initially; after 16 hours aging at 360° F.(182° C.), PV/YP = 7/10, WL = 35.0(e), SS = 135(b); HTWL(a) = 100.
(a)HTWL is high temperature water loss, mL/30 min
(b)SS is shear strength, lb/100 ft²
(c)cp
(d)lb/100 ft²
(e)mL/30 min
Note: A dash signifies no determination was made A comparison of the data presented in Tables 3A, 3B and 3C shows that the polymers prepared in n-hexane, cyclohexane or Freon-113 ® are all about equivalent in performance as water loss control agents, particularly when employed at a concentration of 2 lb/bbl in the mud under test. At this concentration, after aging for about 16 hours at about 360° F. (182° C.) the results indicate that the polymers may slightly lose some water loss control. The results in Example III indicate that the 60:40 or 70:30 AA:MMA copolymers are about equivalent in performance. The initiator level used in preparing the polymers did not appear to be a controlling factor in this series. The high temperature water loss properties shown by the polymers are good.

EXAMPLE IV

This example is directed to the determination of high temperature water loss properties of the polymers of the instant invention in gypsum muds. The polymers described in Example I and Table 1B, prepared at about 50° C. in Freon-113 ®, were also tested in the bentonite clay/Desco thinner-treated mud described in Example III, this mud being additionally treated with 1 or 2 lb of gypsum per barrel. As described above, plastic viscosity, yield point and water loss were determined initially and again after aging for about 16 hours at about 360° F. (182° C.). High temperature water loss values were also determined. Unless specified otherwise, each treated mud was also treated with 3 lb of polymer per barrel of mud. The results are presented in Table 4.

TABLE 4

AA-MMA Copolymers, High Temperature Tests in Gypsum Mud

| Polymer Wt. % MMA | Gypsum Lb/Bbl | Initial Properties | | Aged 16 Hours at 360° F.(182° C.) | | |
|---|---|---|---|---|---|---|
| | | PV(a)/YP(b) | WL(c) | PV(a)/YP(b) | WL(c) | HTWL(d) |
| 0 | 0 | 9/4 | 7.0 | 4/5 | 21.5 | 60 |
| 0 | 1 | 7/11 | 11.5 | 6/7 | 16.0 | 70 |
| 0 | 2 | 2/26 | 17.0 | 6/22 | 43.0 | — |
| 5 | 0 | 9/4 | 6.5 | 5/2 | 28.0 | 58 |
| 5 | 1 | 8/4 | 11.0 | 4/7 | 20.0 | 280 |
| 10 | 0 | 9/5 | 8.0 | 4/5 | 31.0 | 74 |
| 10 | 1 | 7/8 | 15.5 | 4/7 | 16.0 | 86 |
| 20 | 0 | 9/4 | 10.0 | 4/3 | 43.0 | 80 |
| 20 | 1 | 8/7 | 20.0 | 4/6 | 31.0 | 74 |
| 30 | 1 | 10/5 | 15.0 | 4/2 | 16.0 | 54 |
| 0 | 2 | 9/10 | 18.5 | 6/9 | 34.0 | — |
| 40* | 0 | 10/15 | 10.9 | 5/4 | 32.2 | 70 |
| 40 | 1 | 13/1 | 8.0 | 4/0 | 12.0 | 124 |
| 40 | 2 | 11/7 | 6.8 | 4/5 | 15.0 | — |

*Test made with 2.37 lb polymer per barrel
(a)cp
(b)lb/100 ft²
(c)mL/30 min
(d)HTWL is high temperature water loss, mL/30 min
Note: A dash signifies no determination was made.

The gypsum-contaminated muds present a severe test for the polymers being evaluated and the severity of this test is reflected in the relatively high high temperature water loss (HTWL) value shown in Table 4. Based on these values, the results suggest that the 70:30

AA:MMA copolymer achieved better results in a gypsum-contaminated mud than the did the other copolymers tested.

EXAMPLE V

This example is directed to the evaluation of acrylic acid-methyl methacrylate-vinyl acetate (AA-MMA-VA) terpolymers as water loss agents. The polymers were prepared in the same manner described in Example I. Thus, about 20 g total monomers, about 200 mL of Freon-113 ® and about 0.75 weight percent BPP based on total monomers weight were charged to the crown top beverage bottle, followed by degassing and rotation for about 24.5 hours to effect polymerization. Conversions averaging from about 90 to about 100 percent were achieved. Each sample was isolated and converted to the sodium salt as previously described. Each polymer was evaluated for water loss control in saline mud A and saturated saline mud B as described before at room temperature. The results are presented in Table 5.

TABLE 5

AA-MMA-VA Terpolymers As Water Loss Control Agents

| Wt. Percent | | | Saline Mud A | | Saturated Saline Mud B | |
|---|---|---|---|---|---|---|
| AA | MMA | VA | 1 Lb/Bbl WL(A) | 3 Lb/Bbl WL(a) | 1 Lb/BBl WL(a) | 3 Lb/Bbl WL(a) |
| 60 | 0 | 40 | 22 | 5.5 | 74 | 5.7 |
| 60 | 10 | 30 | 22 | 6.5 | 41 | 5.5 |
| 60 | 20 | 20 | 21 | 7.5 | 22 | 7.5 |
| 60 | 30 | 10 | 19 | 7.0 | 17 | 4.7 |
| 60 | 40 | 0 | 17 | 10.0 | 21 | 4.4 |
| 70 | 0 | 30 | 24 | 6.8 | 71 | 8.3 |
| 70 | 10 | 20 | 27 | 6.5 | 30 | 6.8 |
| 70 | 20 | 10 | 35 | 8.0 | 22 | 10.0 |
| 70 | 30 | 0 | 33 | 10.5 | 19 | 7.0 |

(a)mL/30 min

The data presented in Table 5 demonstrate that the terpolymers can function as water loss control agents at moderate temperatures. The results suggest that a 60:30:10 AA:MMA:VA terpolymer will perform effectively in drilling fluids as a water loss control agent.

EXAMPLE VI

Copolymers containing 75 weight percent methacrylic acid (MAA) and 25 weight percent methyl acrylate (MA), based on the total weight of the monomers, and containing 75 weight percent acrylic acid (AA) and 25 weight percent methyl acrylate (MA), based on the total weight of the monomers, were separately prepared in n-hexane in the manner previously described. As before, the copolymers, in their sodium salt form, were each evaluated at about 325° F. (163° C.) and at a differential pressure of about 500 psi to determine their high temperature water loss (HTWL) properties in saline mud at various copolymer-mud concentrations in the absence or presence of gypsum in the mud at various gypsum-mud concentrations. The gypsum-free saline mud was prepared in water containing about 4 weight percent NaCl, and was additionally treated with 2 lb/bbl of the previously mentioned Desco thinner and 5 lb/bbl of Tannathin lignite. The solids content of the finished mud was calculated to be about 2.7 weight percent bentonite clay, about 2.19 weight percent illite clay and about 30 weight percent barite, based on the total weight of the finished mud. The initial pH of the mud samples ranged from about 10.0 to about 10.9. The results are given in Table 6.

TABLE 6

MMA-MA and AA-MA Copolymers as High Temperature Water Loss (HTWL) Control Agents

| Copolymer | Gypsum (a) | Copolymer Concentration, (b) | HTWL, (c) at 325° F. (163° C.) |
|---|---|---|---|
| (d) | 0 | 1 | 28 |
| (d) | 0 | 2 | 30 |
| (d) | 1 | 2 | 51(f) |
| (d) | 1 | 3 | 26 |
| (d) | 2 | 2 | 136 |
| (d) | 2 | 3 | 135 |
| (e) | 0 | 1 | 44 |
| (e) | 0 | 2 | 28 |
| (e) | 1 | 3 | 120 |
| (e) | 1 | 2 | — |
| (e) | 2 | 3 | 260 |
| (e) | 2 | 2 | 258(f) |

(a) lb gypsum per 42 gal bbl of mud
(b) lb copolymer per 42 gal bbl of mud
(c) high temperature water loss, mL/30 min
(d) MAA-MA copolymer, 75 wt. % MAA, 25 wt. % MA
(e) AA-MA copolymer, 75 wt. % AA, 25 wt. % MA
(f) Average value for two separately prepared mud samples
Note: A dash signifies no determination was made.

The results show that the MAA-MA copolymer is substantially more effective as a high temperature water loss agent than is the AA-MA copolymer in gypsum-contaminated muds under the conditions employed.

EXAMPLE VII

This example is directed to the evaluation of the neutralization of acrylic acid-methyl methacrylate copolymer (AA-MMA) in situ, that is while in a slurry with the polymerization reaction medium and the polymerization initiator. Four samples of acrylic acidcontaining copolymers were prepared in which the acrylic acid (AA) content was about 70 wt.% and the methyl methacrylate content was about 30 wt.%, based on the total weight of the monomers. In control run 1 the total monomers weight was about 20 g; about 0.1 g of t-butylperoxypivalate (BPP) solution containing about 0.075 g of BPP in mineral spirits, which is equivalent to about 0.375 wt.% based on the total monomers weight, was used; and the reaction medium was about 200 mL of n-hexane. In each of runs 2–4 the total monomers weight was about 60.0 g; about 0.3 g of BPP solution containing about 0.225 g of BPP in mineral spirits, which is equivalent to about 0.375 wt.% based on the total monomers weight, was used; and the reaction medium was about 600 mL of n-hexane. In run 1 the monomers, BPP initiator and n-hexane reaction medium were charged to a 10 oz. crown top beverage bottle and in each of runs 2–4 the monomers, BPP initiator and n-hexane reaction medium were charged to a 32 oz. crown top beverage bottle, followed by degassing for from about 20 to about 35 minutes and rotation in a 50° C. bath for about 40 hours to effect polymerization. A 50% aqueous base solution consisting of equal weight quantities of sodium hydroxide and water was prepared and quantities of this base ranging from about 27.6 g to about 48.8 g were added to the bottles containing the resulting copolymer slurries in runs 2–4 for about 24 hours while rotating the bottles in a 50° C. bath. The copolymers produced in each of the four runs were then removed from their respective bottles and suction filtered through coarse fritted glass funnels, then vacuum dried and tared pans and weighed. In runs 2–4 about 5.0 g of each thus dried polymer was then added to about 95.0 g of water in a 250 mL beaker and magnetically stirred and the pH values thereof checked periodically during the stirring until the observed pH value of each sample became stabilized. In run 1 about 15 g of dried copolymer was added to about 150 g of water in a suitable vessel, mixed and the stabilized pH value observed. The results are presented in Table 7.

of 135 g $H_2O$ and 17.5 mL of 6M NaOH to provide a neutralized polymer solution having a pH of 6.5.

Polymerization mixtures from Runs 2 and 3 were each neutralized according to the instant invention by cooling the slurries to room temperature then charging 11.0 g. of 50 wt.% aqueous NaOH to each bottle. The bottles were then replaced in the 50° C. bath for two TABLE 7
IN SITU NEUTRALIZATION OF POLY (ACRYLIC ACID-CO-METHYL METHACRYLATE) (AA-MMA)

| Run | AA, g | MMA, g | n-hexane mL | BPP, g | Polymerization time, hr | 50% NaOH, g | Final pH | Dry Polymer Dissolution in $H_2O$, min |
|---|---|---|---|---|---|---|---|---|
| 1 | 14.0 | 6.0 | 200 | 0.1 | 40 | 0 | 2.8 | — |
| 2 | 42.0 | 18.0 | 600 | 0.3 | 40 | 27.6 | 5.5 | 63 |
| 3 | 42.0 | 18.0 | 600 | 0.3 | 40 | 37.3 | 6.2 | 24 |
| 4 | 42.0 | 18.0 | 600 | 0.3 | 40 | 46.8 | 7.0 | 32 |

Inspection of the data presented in Table 7 shows that the in situ polymerization slurry-neutralized polymers of runs 2, 3 and 4 each provide about a 5.3 wt.% solution of the copolymer salt with a pH value in the range from about 5.5 to about 7.0. It was further observed during the neutralization that no clumping or change of viscosity was visible in the slurry and no precipitation of the copolymer was apparent. The dried polymers from runs 2-4 appeared as slightly grainy white powders and were readily soluble in water, as shown by the dry polymer dissolution time values.

EXAMPLE VIII

Three other runs were made to produce acrylic acid/methyl methacrylate (60/40) copolymers in cyclohexane slurry for evaluation of the polymers, neutralized in several different ways, as water loss control agents in Saline Mud A and Saturated Saline Mud B.

hours additional mixing. The physical appearance of the slurries did not change during the neutralization step. The neutralized polymer slurries were then filtered and the recovered polymers dried under vacuum. Polymer from Run 2 (18.0 g) was dissolved in 162.0 g $H_2O$ to provide a solution having a pH of 5.47. A 5 gram sample of polymer from Run 3 was dissolved in 95 g $H_2O$ to check the pH which was found to be 5.82. The remainder of polymer from Run 3 (19 g) was provided as a dry powder for testing in the drilling mud formulations. The solutions prepared above from Runs 1 and 2 each had a solids concentration of 10% by weight.

The neutralized polymers prepared as described were then tested at two concentration levels in Saline Mud A and Saturated Saline Mud B with both initial properties and aged properties (16 hours at 80° C.) being recorded. The results obtained in these tests are presented in Table 8.

TABLE 8

| Polymer | | Initial Properties | | | Aged 16 Hours at 80° C. | | |
|---|---|---|---|---|---|---|---|
| Run No. | Conc. lb/Bbl | pH | PV(a)/YP(b) | WL(c) | pH | PV(a)/YP(b) | WL(c) |
| Part I: Neutralized AA-MMA (60/40) Copolymer in Saline Mud A | | | | | | | |
| 1 | 1 | 7.7 | 5/0 | 29.0 | 7.7 | 4/0 | 34.0 |
|   | 3 | 7.6 | 14/0 | 4.0 | 7.6 | 9/0 | 5.0 |
| 2 | 1 | 7.6 | 5/0 | 32.0 | 7.7 | 4/1 | 39.0 |
|   | 3 | 8.3 | 8/3 | 4.0 | 7.4 | 7/2 | 5.4 |
| 3 | 1 | 7.0 | 5/0 | 40.0 | 7.3 | 5/0 | 48.0 |
|   | 3 | 7.2 | 8/0 | 5.5 | 9.0 | 8/1 | 5.6 |
| Base Mud | 0 | — | — | 173 | — | — | — |
| Part II: In Saturated Saline Mud B | | | | | | | |
| 1 | 1 | 8.0 | 4/0 | 20.0 | 8.0 | 2/2 | 21.5 |
|   | 3 | 7.9 | 7/1 | 8.0 | 7.9 | 5/2 | 8.8 |
| 2 | 1 | 7.9 | 5/0 | 37.0 | 7.4 | 4/1 | 37.0 |
|   | 3 | 7.6 | 6/0 | 17.4 | 7.4 | 4/2 | 13.8 |
| 3 | 1 | 7.4 | 3/2 | 48.0 | 7.7 | 3/1 | 43.0 |
|   | 3 | 8.5 | 5/1 | 15.0 | 7.4 | 4/2 | 14.7 |
| Base Mud | 0 | — | — | 138 | — | — | — |

(a)cp
(b)lb/100 ft$^2$
(c)mL/30 min

The polymers were prepared in 10 oz. crown top beverage bottles with each bottle being charged with 12 g acrylic acid, 8 g methyl methacrylate, 0.2 g BPP initiator and 200 mL cyclohexane (85% purity). After the usual degassing procedure each polymerization was conducted at 50° C. for 24 hours to essentially 100% monomer conversion.

Polymer from Run 1 was filtered from the polymerization mixture and dried under vacuum. A portion of the dried polymer (15.0 g) was then added to a mixture The results in Table 8 demonstrate that each of the polymers for Runs 1-3 were operable to provide water loss control to Saline Mud A and Saturated Saline Mud B at both concentration levels. The polymers made according to this invention (Runs 2 and 3) were less effective than the control polymer (Run 1) for water loss control. The dried in situ neutralized polymer (Run 3) appeared to be slightly less effective than the in situ neutralized polymer provided as a solution (Run 2) for the drilling mud tests.

EXAMPLE IX

Other runs were conducted in a 20 gallon reactor for the preparation of acrylic acid/methyl methacrylate (70/30) copolymers in cylohexane slurry for testing as water loss control agents in Saline Mud A and Saturated Saline Mud B. The initiator level was varied in these runs and several different neutralization procedures were employed. The polymerization recipe and charge procedure employed in this series of runs is shown below.

| Polymerization Recipe | |
|---|---|
| | Parts, by wt. |
| Cyclohexane | 800[a] |
| Acrylic acid | 70 |
| Methyl methacrylate | 30 |
| Initiator (BPP)[b] | variable |
| Temperature, °C. | 50 ± 2 |
| Time, hours | 4–16 |
| Monomer conversion, % | 100 |

[a]Run 1 employed 600 parts by weight
[b]75% by wt. solution in mineral spirits (Lupersol-11)
Charge Order: Cyclohexane, initiator, acrylic acid, and methyl methacrylate.
The total monomer charge in each run was 15 pounds.

The initiator level and neutralization procedures are presented below in Table 9.

TABLE 9

Initiator Level and Neutralization of AA-MMA (70/30) Copolymers Prepared in Cyclohexane Slurry

| Run No. | BPP parts | Neutralization Procedure |
|---|---|---|
| 1 | 1.0 | Discharged polymer slurry to blowdown tank. Added 9.25 lb of 50% by wt. aqueous NaOH with stirring at room temperature. pH of polymer sample in distilled H₂O was 6.9. Filtered polymer from slurry. |
| 2 | 0.5 | Same as Run 1. Added total of 9.25 lb of 50% by wt. aqueous NaOH in 3 equal increments with stirring at room temperature. pH of polymer sample in distilled water was 9.2. Filtered polymer from slurry |
| 3 | 0.25 | Same as Run 2. pH of polymer sample in tap water was 8.0. Filtered polymer from slurry. |
| 4 | 0.25 | Added 9.25 lb of 50% by wt. aqueous NaOH with stirring at room temperature to reactor. Heated to 50° C. with stirring for one hour. Devolatilized for 3.5 hours at a maximum temperature of 82° C., vacuum of 25 inches Hg to volatiles of 7.7%. Added softened water to make a solution of 17.1% solids, pH 6.2. |
| 5 | 0.25 | Dried in reactor to 37% volatiles. Added 9.25 lb of 50% by wt. aqueous NaOH and 54.2 lb softened water to provide a polymer solution, 22.7% by wt., pH 6.5. |
| 6 | 0.15 | Dried in reactor to 9% volatiles. Added 9.25 lb of 50% by wt. aqueous NaOH and 52.8 lb softened water to provide a polymer solution, 23.5% by wt., pH 6.9. |

Polymers from Runs 1–3 above were dried further before testing in the drilling muds while polymer solutions obtained in Runs 4–6 were used in the drilling mud tests. The results of these water loss control tests are shown in Table 10.

TABLE 10

Neutralized AA-MMA (70/30) Copolymers

| Polymer | | Initial Properties | |
|---|---|---|---|
| Run No. | Conc., Lb/Bbl | Saline Mud A WL, mL/30 min | Saturated Saline Mud B WL, mL/30 min |
| 1 | 1 | 74 | 48 |
|   | 3 | 43 | 14.1 |
| 2 | 1 | 84 | 43 |
|   | 3 | 44 | 10.2 |
| 3 | 1 | 67 | 45 |
|   | 3 | 40 | 10.2 |
| 4 | 1 | 68 | 45 |
|   | 3 | 29 | 10.5 |
| 5 | 1 | 31 | 38.5 |
|   | 3 | 8.7 | 6.6 |
| 6 | 1 | 22 | 23 |
|   | 3 | 8.5 | 5.8 |

The results in Table 10 show that each of the polymers from Runs 1–6 were operable at both concentrations to provide a water loss control effect in both drilling muds. It is also seen that the polymers of Runs 1–4 which were neutralized according to the instant invention i.e. by an in situ neutralization of the polymer slurry with concentrated aqueous base, were not as effective as polymers from Runs 5 and 6 which were subjected to a drying step before treatment with an aqueous base.

The use of the in situ neutralization of polyacids or acidic polymers or copolymers as described above simplifies the production of such polymer salts for use as drilling fluid additives or the like by eliminating a separate neutralization step after separating the polymer from the reaction medium. Furthermore, the use of such simplified one-step preparation of dry polyacid or acid polymer or copolymer salts in combination with subsequent drying of such salts provides polyacid or acidic polymer or copolymer salts which are readily dispersible in aqueous solutions, such as drilling fluids, and provides dry, water-dispersible products which can be economically packaged, transported and handled until such time as it is desired to directly introduce such dry products into the aqueous solutions of interest, such as, for example, drilling fluids.

As discussed earlier, the polymers of this invention are preferably employed as the sodium salts since the salts are water soluble. However, it is possible to use the acid forms of the polymers alone although this is less preferred because the polymers in this form do not dissolve well in aqueous solutions. In fact, when the methyl methacrylate content of these polymers is in the range from about 30 weight percent or higher, the acid forms of the polymers are insoluble in water. In spite of this factor, the acid forms of the polymers are capable of acting as water loss control agents.

Although not previously emphasized, another feature of the polymers of the present invention is that they contribute little or not at all to the viscosity of the mud in which they are placed. This feature is of extreme importance when the polymers are to be added to muds having a high solids content.

In operation, the drilling fluids or muds described above are preferably circulated downwardly through a tubular drill string and out through the drill bit on the lower end of the drill string in the bottom of a borehole. The drilling fluids are further circulated upwardly through the annulus between the drill string and the wall of the borehole whereby cuttings from the bottom of the borehole are conveyed to be earth's surface and the polymeric water loss additive of the drilling fluid contacts the penetrated formations to control water loss from the borehole into the thus contacted formations. After each passage of the drilling fluids through the drill string and borehole annulus the drilling fluid is preferably passed through a settling tank or trough where sand and drill cuttings are separated, with or without screening. The drilling fluid is then again pumped into the drill string by a mud pump to continue the circulation as described.

From the foregoing it will be seen that the polymers of the instant invention readily achieve the objects and advantages set forth above. Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the instant disclosure. Accordingly, modifications are contemplated which can be made without departing from the spirit and scope of the described invention limited only by the claims appended hereto.

We claimed:

1. A method of preparing a composition suitable for use as a drilling fluid, comprising the steps of:
   (a) copolymerizing a hydrophilic vinyl monomer selected from the group consisting of acrylic acid, methacrylic acid, other related monomers and mixtures of any two or more thereof with at least one hydrophobic vinyl monomer selected from the group consisting of acrylic acid esters, methacrylic acid esters, vinyl esters of saturated monocarboxylic acids having from 1 to 3 carbon atoms, and combinations of any two or more thereof under polymerization conditions in an inert low chain transfer organic liquid medium selected from the group consisting of n-hexane, cyclohexane and chlorofluorocarbons at a polymerization temperature and for a period of polymerization time sufficient to produce a copolymer having a weight average molecular weight in the range from about 100,000 to about 500,000;
   (b) contacting said resulting copolymer in said inert, low chain transfer, organic liquid medium selected from the group consisting of n-hexane, cyclohexane and chlorofluorocarbons with an aqueous solution of sodium hydroxide which is present in a quantity sufficient to raise the pH of the subsequently dried copolymer salt in a polymer solution in water of at least about 1 weight percent concentration to a value in the range from about 5.3 to about 12 to produce the salt form of said resulting copolymer;
   (c) drying the salt form of said resulting copolymer produced by step (b) to produce a dried copolymer salt;
   (d) adding a quantity of the dried copolymer salt produced in accordance with step (c) to a quantity of a mixture comprising water and a clay substance suspended in said water; and
   (e) mixing said dried copolymer salt, said water and said clay substance to produce a drilling fluid.

2. In a method of drilling a borehole in the earth of the type wherein the borehole is formed by drilling means for penetrating the earth to the bottom of said borehole, the improvement comprising:
   circulating a drilling fluid prepared in accordance with claim 1 through said borehole to the bottom thereof.

3. A method in accordance with claim 1 wherein said aqueous solution of sodium hydroxide contains at least 35 wt.% sodium hydroxide based on the total weight of said aqueous solution.

4. In a method of drilling a borehole in the earth of the type wherein the borehole is formed by drilling means for penetrating the earth to the bottom of said borehole, the improvement comprising:
   circulating a drilling fluid prepared in accordance with claim 3 through said borehole to the bottom thereof.

5. A method in accordance with claim 1 wherein said hydrophilic vinyl monomer consists essentially of acrylic acid.

6. In a method of drilling a borehole in the earth of the type wherein the borehole is formed by drilling means for penetrating the earth to the bottom of said borehole, the improvement comprising:
   circulating a drilling fluid prepared in accordance with claim 5 through said borehole to the bottom thereof.

7. A method in accordance with claim 5 wherein said aqueous solution of sodium hydroxide contains at least 35 wt.% sodium hydroxide based on the total weight of said aqueous solution.

8. In a method of drilling a borehole in the earth of the type wherein the borehole is formed by drilling means for penetrating the earth to the bottom of said borehole, the improvement comprising:
   circulating a drilling fluid prepared in accordance with claim 7 through said borehole to the bottom thereof.

9. A method in accordance with claim 1 wherein said hydrophilic vinyl monomer consists essentially of acrylic acid and said at least one hydrophobic vinyl monomer consists essentially of methyl methacrylate.

10. In a method of drilling a borehole in the earth of the type wherein the borehole is formed by drilling means for penetrating the earth to the bottom of said borehole, the improvement comprising:
    circulating a drilling fluid prepared in accordance with claim 9 through said borehole to the bottom thereof.

11. A method in accordance with claim 9 wherein said aqueous solution of sodium hydroxide contains at least 35 wt.% sodium hydroxide based on the total weight of said aqueous solution.

12. In a method of drilling a borehole in the earth of the type wherein the borehole is formed by drilling means for penetrating the earth to the bottom of said borehole, the improvement comprising:
    circulating a drilling fluid prepared in accordance with claim 11 through said borehole to the bottom thereof.

13. A method in accordance with claim 1 wherein said hydrophilic vinyl monomer consists essentially of acrylic acid and said at least one hydrophobic vinyl monomer comprises methyl methacrylate and vinyl acetate, said acrylic acid, methyl methacrylate and vinyl acetate being present in a mole ratio in the range from about 2.8:1:0.33 to about 8.3:1:3.5.

14. In a method of drilling a borehole in the earth of the type wherein the borehole is formed by drilling means for penetrating the earth to the bottom of said borehole, the improvement comprising:

circulating a drilling fluid prepared in accordance with claim 13 through said borehole to the bottom thereof.

15. A method in accordance with claim 13 wherein said aqueous solution of sodium hydroxide contains at least 35 wt.% sodium hydroxide based on the total weight of said aqueous solution.

16. In a method of drilling a borehole in the earth of the type wherein the borehole is formed by drilling means for penetrating the earth to the bottom of said borehole, the improvement comprising:

circulating a drilling fluid prepared in accordance with claim 15 through said borehole to the bottom thereof.

17. A method in accordance with claim 5 wherein the mole ratio of said acrylic acid to said at least one hydrophobic vinyl monomer is in the range from about 7:1 to about 1:1.

18. A method in accordance with claim 5 wherein the mole ratio of said acrylic acid to said at least one hydrophobic vinyl monomer is in the range from about 3.5:1 to about 2:1.

19. A method in accordance with claim 9 wherein the mole ratio of said acrylic acid to said methyl methacrylate is in the range from about 3.2:1 to about 2.1:1.

20. A method in accordance with claim 1 wherein said hydrophilic vinyl monomer consists essentially of acrylic acid and said at least one hydrophobic vinyl monomer comprises methyl methacrylate and vinyl acetate, said acrylic acid, methyl methacrylate and vinyl acetate being present in a mole ratio in the range from about 4.8:1:0.58 to about 9.7:1:2.3.

21. A method in accordance with claim 1 wherein said hydrophilic vinyl monomer consists essentially of acrylic acid and said at least one hydrophobic vinyl monomer comprises methyl methacrylate and vinyl acetate, said acrylic acid, methyl methacrylate and vinyl acetate being present in a weight ratio in the range from about 60:30:10 to about 60:10:30, based on the total weight of said monomers present in said copolymerization.

22. A method in accordance with claim 1 wherein said hydrophilic vinyl monomer consists essentially of acrylic acid and said at least one hydrophobic vinyl monomer comprises methyl methacrylate and vinyl acetate, said acrylic acid, methyl methacrylate and vinyl acetate being present in a weight ratio in the range from about 70:10:20 to about 70:20:10 based on the total weight of said monomers present in said copolymerization.

23. A method in accordance with claim 1 wherein said acrylic acid and said methyl methacrylate are present in a weight ratio of from about 70:30 to about 60:40 based on the total weight of said acrylic acid and said methyl methacrylate present in said copolymerization.

24. In a method of drilling a borehole in the earth of the type wherein the borehole is formed by drilling means for penetrating the earth to the bottom of said borehole, the improvement comprising:

circulating a drilling fluid in accordance with claim 22 through said borehole to the bottom thereof.

25. In a method of drilling a borehole in the earth of the type wherein the borehole is formed by drilling means for penetrating the earth to the bottom of said borehole, the improvement comprising:

circulating a drilling fluid in accordance with claim 17 through said borehole to the bottom thereof.

26. In a method of drilling a borehole in the earth of the type wherein the borehole is formed by drilling means for penetrating the earth to the bottom of said borehole, the improvement comprising:

circulating a drilling fluid in accordance with claim 18 through said borehole to the bottom thereof.

27. In a method of drilling a borehole in the earth of the type wherein the borehole is formed by drilling means for penetrating the earth to the bottom of said borehole, the improvement comprising:

circulating a drilling fluid in accordance with claim 13 through said borehole to the bottom thereof.

28. In a method of drilling a borehole in the earth of the type wherein the borehole is formed by drilling means for penetrating the earth to the bottom of said borehole, the improvement comprising:

circulating a drilling fluid in accordance with claim 20 through said borehole to the bottom thereof.

29. In a method of drilling a borehole in the earth of the type wherein the borehole is formed by drilling means for penetrating the earth to the bottom of said borehole, the improvement comprising:

circulating a drilling fluid in accordance with claim 21 through said borehole to the bottom thereof.

30. In a method of drilling a borehole in the earth of the type wherein the borehole is formed by drilling means for penetrating the earth to the bottom of said borehole, the improvement comprising:

circulating a drilling fluid in accordance with claim 22 through said borehole to the bottom thereof.

31. In a method of drilling a borehole in the earth of the type wherein the borehole is formed by drilling means for penetrating the earth to the bottom of said borehole, the improvement comprising:

circulating a drilling fluid in accordance with claim 23 through said borehole to the bottom thereof.

32. A method in accordance with claim 1 wherein said hydrophilic vinyl monomer consists essentially of methacrylic acid and said at least one hydrophobic vinyl monomer consists essentially of methyl acrylate.

33. In a method of drilling a borehole in the earth of the type wherein the borehole is formed by drilling means for penetrating the earth to the bottom of said borehole, the improvement comprising:

circulating a drilling fluid in accordance with claim 32 through said borehole to the bottom thereof.

34. A method in accordance with claim 1 wherein said hydrophilic vinyl monomer consists essentially of methacrylic acid.

35. A method in accordance with claim 34 wherein said at least one hydrophobic vinyl monomer consists essentially of methyl methacrylate.

36. In a method of drilling a borehole in the earth of the type wherein the borehole is formed by drilling means for penetrating the earth to the bottom of said borehole, the improvement comprising:

circulating a drilling fluid in accordance with claim 34 through said borehole to the bottom thereof.

37. In a method of drilling a borehole in the earth of the type wherein the borehole is formed by drilling means for penetrating the earth to the bottom of said borehole, the improvement comprising:

circulating a drilling fluid in accordance with claim 35 through said borehole to the bottom thereof.

* * * * *